(12) United States Patent
Boué et al.

(10) Patent No.: US 12,530,293 B2
(45) Date of Patent: Jan. 20, 2026

(54) SYSTEM AND METHOD FOR PROCESSING QUERIES AGAINST SEMANTIC CACHE ENTRIES USING UNIQUE DISTANCE-BASED THRESHOLDS

(71) Applicant: Microsoft Technology Licensing, LLC, Redmond, WA (US)

(72) Inventors: Laurent Boué, Petah Tikva (IL); Yasmin Bokobza, Ramat Gan (IL); Kiran Rama, Bangalore (IN); Naveen Panwar, Karnataka (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/737,366

(22) Filed: Jun. 7, 2024

(65) Prior Publication Data
US 2025/0378028 A1    Dec. 11, 2025

(51) Int. Cl.
*G06F 12/08* (2016.01)
*G06F 12/0802* (2016.01)

(52) U.S. Cl.
CPC ................. *G06F 12/0802* (2013.01)

(58) Field of Classification Search
CPC .................................... G06F 12/0802
See application file for complete search history.

(56) References Cited

U.S. PATENT DOCUMENTS

2023/0185468 A1*  6/2023  Ikeda ................... G06F 12/0284
711/1

OTHER PUBLICATIONS

Extended European search report received for European Application No. 25180429.0, mailed on Aug. 8, 2025, 13 pages.
Rasool, et al., "LLMs for Test Input Generation for Semantic Applications", Proceedings of the IEEE/ACM 3rd International Conference on AI Engineering—Software Engineering for AI, Jun. 11, 2024, pp. 160-165.
Li, et al., "TagGPT: Large Language Models are Zero-shot Multimodal Taggers", Arxiv Cornell University, Apr. 6, 2023, 13pages.
Ren, et al., "Deep Clustering: A Comprehensive Survey", Arxiv Cornell University, Oct. 9, 2022, 20 pages.

(Continued)

*Primary Examiner* — Jae U Yu

(57) ABSTRACT

A method, computer program product, and computing system for processing a dataset of query-answer pairs. Synthetic variations of queries are generated and each of the synthetic variations of queries are mapped to a corresponding answer from the dataset. An embedding dataset is generated by transforming the synthetic variations into synthetic query embeddings and the queries into query embeddings. A first set of embeddings is defined for storage in a semantic cache and a second set of embeddings are defined and are not stored in the semantic cache. A separate distance threshold is assigned to each embedding of the first set of embeddings and a pairwise distance between each query and the synthetic variations is determined. Distance thresholds for respective pairwise distances between a query and synthetic variations of the query are generated. Subsequent queries are processed using the semantic cache and the distance thresholds.

20 Claims, 6 Drawing Sheets

(56) References Cited

OTHER PUBLICATIONS

Sim, et al., "GPTCache : A Library for Creating Semantic Cache for LLM Queries", accessed on URL: https://github.com/zilliztech/GPTCache, Nov. 28, 2023, 9 pages.
Vardakas, et al., "Deep Clustering Using the Soft Silhouette Score: Towards Compact and Well-Separated Clusters", Arxiv Cornell University, Feb. 1, 2024, 15 pages.
Wei, et al., "Finetuned Language Models Are Zero-Shot Learners," arXiv, arXiv:2109.01652v5 [cs.CL], Feb. 8, 2022, 46 pages.

* cited by examiner

10

(A)

↓

116 — generating a plurality of distance thresholds for respective pairwise distances between a query and respective synthetic variations of the query using the separate distance threshold assigned for each embedding of the first set of embeddings and the pairwise distance between each query of the query-answer pairs and the plurality of synthetic variations of the respective query

↓

118 — processing a subsequent query using the plurality of synthetic variations of queries from the semantic cache and the plurality of distance thresholds

130 — generating a classification score by processing each query associated with each of the second set of embeddings against the first set of embeddings in the semantic cache

↓

132 — performing iterative optimizations on the separate distance thresholds assigned to each embedding of the first set of embeddings using the classification score

↓

134 — training a regression model to generate the plurality of distance thresholds by using the pairwise distance between each query of the query-answer pairs and the plurality of synthetic variations of the respective query

136 — determining a distance between the subsequent query and each of the plurality of synthetic variations of queries

↓

138 — identifying a nearest neighbor query from the plurality of synthetic variations of queries from the semantic cache using the distance between the subsequent query and each of the plurality of synthetic variations of queries

↓

140 — determining a distance threshold for nearest neighbor query based upon, at least in part, the plurality of distance thresholds

↓

142 — providing an answer associated with the nearest neighbor query from the semantic cache in response to determining that the distance between the subsequent query and the nearest neighbor query

FIG. 1B

SYSTEM AND METHOD FOR PROCESSING QUERIES AGAINST SEMANTIC CACHE ENTRIES USING UNIQUE DISTANCE-BASED THRESHOLDS

BACKGROUND

With the prevalence of generative artificial intelligence (AI) models, such as large language models (LLMs), question/answering (QA) systems are now powering many applications across various business environments. On the software side, semantic caches have emerged as a viable solution to reduce inference latency and to reduce the financial costs associated with those applications.

Inspired by traditional caches, semantic caches store previously seen questions and their answers so that the next time a user asks a similar question, the QA system can directly retrieve the answer from the semantic cache, therefore bypassing expensive (i.e., in time and in cost) application programming interface (API) calls (oftentimes proprietary) to an LLM. As API calls are processed and completed on the scale of seconds (and even longer for queries with many tokens), the response time requirements are much more lenient than in traditional CPU cache systems. This means that simple software-based vector databases can be used to implement semantic caches (as opposed to CPU caches that require specialized chip design).

The main difference with a traditional cache system is that cache hits no longer require exact matches but instead rely on a similarity threshold. This fuzziness is necessary because developers of the applications expect users to ask the same questions many times but in slightly different ways which, even though may be semantically identical to each other, differ in minor language variations or in the choice of words. When a new question comes into the QA system, it is first checked by the semantic cache for the existence of highly similar questions already present in the QA system. If there are such questions, the QA system can directly return the answers to these questions instead of invoking new API calls to the LLM, thereby accelerating the response time and reducing the costs. However, this type of fuzzy matching introduces the possibility of incorrect responses or cache misses due to the rigidity and arbitrariness of the choice of threshold.

BRIEF DESCRIPTION OF THE DRAWINGS

FIGS. 1A-1B are flow charts of implementations of a distance threshold generation process;

Like reference symbols in the various drawings indicate like elements.

DETAILED DESCRIPTION OF THE EMBODIMENTS

Figure 1A:
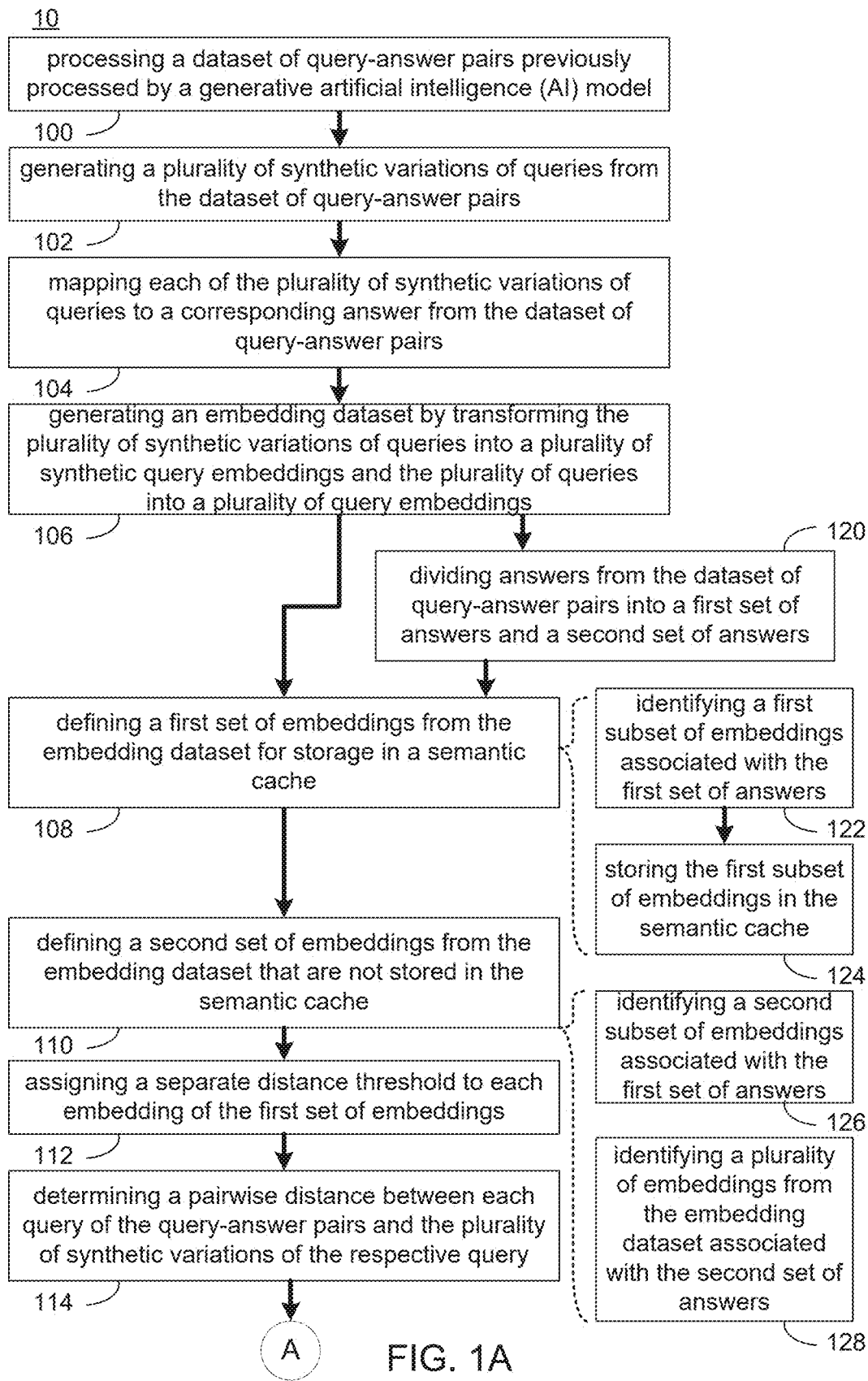

Implementations of the present disclosure generate a distance-dependent F1-optimized similarity threshold based on semantically preserving synthetic variations of the queries already stored in a semantic cache. The threshold function is optimized using the F1 score (i.e., a metric for predictive performance as a function of precision and recall) to improve the performance (i.e., in terms of accuracy as measured by precision and recall) of the semantic cache.

The distance threshold generation process described below processes a dataset of previously processed query-answer pairs. For example, during processing of queries, query-answer pairs are generated to reflect the queries and answers for which API calls are made to a generative AI model (LLM). Synthetic variations of queries are generated and each of the synthetic variations of queries are mapped to a corresponding answer from the dataset. These synthetic variations include semantically similar (i.e., within a predefined difference threshold) queries that result in the same answer. An embedding dataset is generated by transforming the synthetic variations into synthetic query embeddings and the queries into query embeddings. These embeddings include vectors that represent the semantic features of each query that allows the queries to be compared numerically across various features. A first set of embeddings is defined for storage in a semantic cache and a second set of embeddings are defined and are not stored in the semantic cache. These two embedding sets are randomly initialized and allow for the training of unique and separate thresholds for embeddings in a semantic cache by comparing embeddings against answers in the semantic cache in terms of precision and recall. A separate distance threshold is assigned to each embedding of the first set of embeddings and a pairwise distance between each query and the synthetic variations is determined.

Distance thresholds for a pairwise distance between a target query and a synthetic variation of the target query are generated using the separate distance threshold assigned for each embedding of the first set of embeddings and the pairwise distance between each query of the query-answer pairs and the plurality of synthetic variations of the respective query. For example, a combination of true positive, false positive, true negative, and/or false negative results from the comparison of each query against the entries in the semantic cache are used to optimize the unique thresholds as a function of the precision and recall for each query (i.e., the F1 score). Accordingly, the distance threshold generation process 10 generates distance thresholds that are a function of the distance between a query and its nearest neighbor. Using this mapping of nearest neighbor distances to distance thresholds, subsequent queries are processed using the synthetic variations in the semantic cache that allow for more effective semantic cache utilization (i.e., by increasing the number of answers returned from the semantic cache for queries that are within a distance-defined distance threshold generated based on nearest neighbor distance).

The details of one or more implementations are set forth in the accompanying drawings and the description below. Other features and advantages will become apparent from the description, the drawings, and the claims.

The Distance Threshold Generation Process:

Referring to FIGS. 1A-4, distance threshold generation process 10 processes 100 a dataset of query-answer pairs previously processed by a generative AI model. A plurality of synthetic variations of queries are generated 102 from the dataset of query-answer pairs. Each of the plurality of synthetic variations of queries are mapped 104 to a corresponding answer from the dataset of query-answer pairs. An embedding dataset is generated 106 by transforming the plurality of synthetic variations of queries into a plurality of synthetic query embeddings and the plurality of queries into a plurality of query embeddings. A first set of embeddings from the embedding dataset are defined 108 for storage in a semantic cache. A second set of embeddings from the embedding dataset are defined 110 and are not stored in the semantic cache. A separate distance threshold is assigned 112 to each embedding of the first set of embeddings. A pairwise distance between each query of the query-answer pairs and the plurality of synthetic variations of the respective query is determined 114. A plurality of distance thresholds for respective pairwise distances between a query and synthetic variations of the query are generated 116 using the separate distance threshold assigned for each embedding of the first set of embeddings and the pairwise distance between each query of the query-answer pairs and the plurality of synthetic variations of the respective query. A subsequent query is processed 118 using the plurality of synthetic variations of queries from the semantic cache and the plurality of distance thresholds.

Figure 2:
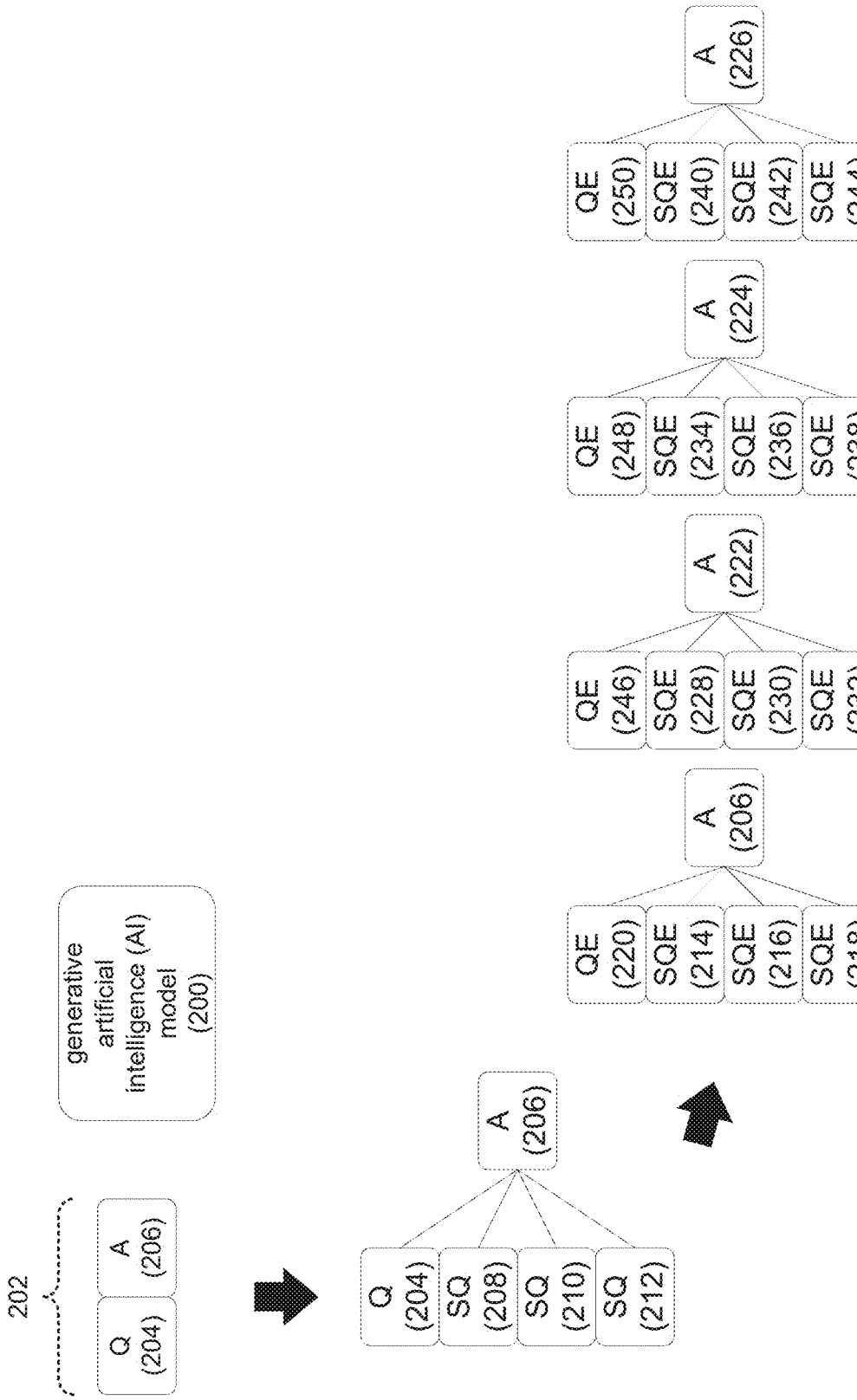
FIGS. 2-4 are diagrammatic views of the distance threshold generation process of FIGS. 1A-1B.

In some implementations, distance threshold generation process 10 processes 100 a dataset of query-answer pairs previously processed by a generative AI model. For example, distance threshold generation process 10 processes a list of queries ($q_i$) where "i" is an index for the number of unique queries that users have asked in the past and the answers ($a_i$) that the a generative AI model (e.g., generative AI model 200) has already provided to these queries (e.g., a data set of query-answer pairs [($q_1$, $a_1$), ($q_2$, $a_2$), . . . ]). A generative AI model (e.g., generative AI model 200) is an algorithm that processes natural language prompts and/or example entries and/or contextual information concerning an incident to generate a response. In some implementations, generative AI model 200 includes a Large Language Model (LLM). A LLM is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language or specific patterns. In one example, distance threshold generation process 10 accesses the dataset of query-answer pairs from a chat telemetry or history associated with generative AI model 200. Referring also to FIG. 2, an example query-answer pair (e.g., query answer pair 202) is shown with query 204 and answer 206. It will be appreciated that the dataset of query-answer pairs may include any number of query-answers pairs within the scope of the present disclosure.

In some implementations, distance threshold generation process 10 generates 102 a plurality of synthetic variations of queries from the dataset of query-answer pairs. For example, each query-answer pair (represented as tuple ($q_i$, $a_i$)), distance threshold generation process 10 generates 102 "N" synthetic variations of $q_i$ that preserve the semantics of queries while introducing syntactic/grammatical variations in the formulation of the query. In some implementations, distance threshold generation process 10 uses existing approaches for generating semantically related queries. In one example, distance threshold generation process 10 uses a language model (not shown) to process query 204 and generate synthetic variations of query 204 by encoding words into a dense vector representation in a continuous vector space, wherein similar words are closer together and are used to generate synthetic variations. In another example, distance threshold generation process 10 uses Siamese networks (i.e., neural networks trained to compare two input sequences to determine their similarity) to generate synthetic variations. In another example, distance threshold generation process 10 uses a semantic hashing model (i.e., a model that maps queries to binary codes in a manner that preserves semantic similarity, allowing for semantically similar synthetic variations of the input query) to generate synthetic variations.

In some implementations, distance threshold generation process 10 maps 104 each of the plurality of synthetic variations of queries to a corresponding answer from the dataset of query-answer pairs. For example and as shown in FIG. 2, distance threshold generation process 10 generates plurality of synthetic variations of queries (e.g., synthetic query variations 208, 210, 212) for query 204. In some implementations, the plurality of synthetic variations may be represented as ($q_{i,1}$, $q_{i,2}$, . . . $q_{i,N}$) where the subscript "i" indicates that synthetic questions are based on a parent query, $q_i$. The initial tuple ($q_i$, $a_i$) is now enriched to {$a_i$:($q_i$, $q_{i,1}$, $q_{i,2}$, . . . $q_{i,N}$)} so that all the synthetic variations of $q_i$ map to the same initial answer $a_i$, where the second subscript "j" indicates the respective synthetic variation number for the parent query "i". Accordingly, a new dataset of queries and synthetic variations with corresponding answers is represented as: $D_{init}$={$a_1$:($q_1$, $q_{1,1}$, $q_{1,2}$, . . . $q_{1,N}$), $a_2$:($q_2$, $q_{2,1}$, $q_{2,2}$, . . . $q_{2,N}$), $a_3$:($q_3$, $q_{3,1}$, $q_{3,2}$, . . . $q_{3,N}$), . . . }. In some implementations, distance threshold generation process 10 provides a "hash-map inspired" notation that an answer $a_i$ is associated with a list of N questions ($q_i$, $q_{i,1}$, $q_{i,2}$, . . . $q_{i,N}$) out of which $q_i$ is the parent query and $q_{i,j}$ are its synthetic descendants.

In some implementations, distance threshold generation process 10 generates 106 an embedding dataset by transforming the plurality of synthetic variations of queries into a plurality of synthetic query embeddings and the plurality of queries into a plurality of query embeddings. An embedding is a vector representation of each word that defines semantic and syntactic relationships between words. For example, distance threshold generation process 10 uses a language model to transform the queries (original and synthetic) into vector embeddings. Given a language model L, embeddings are generated 106 by running L in inference mode on the queries. In other words, $e_{i,j}$=L($q_{i,j}$) where L is a language that converts each query by dividing the query into a plurality of tokens (i.e., words or other predefined segments) and transforms each token into an embedding. The dataset $D_{init}$ is transformed into a dataset $E_{init}$ of embeddings: $E_{init}$={$a_1$:($e_1$, $e_{1,1}$, $e_{1,2}$, . . . $e_{1,N}$), $a_2$:($e_2$, $e_{2,1}$, $e_{2,2}$, . . . $e_{2,N}$>$a_2$), $a_3$:($e_3$, $e_{3,1}$, $e_{3,2}$, . . . $e_{3,N}$), . . . }. As shown in FIG. 2, distance threshold generation process 10 generates 106 an embedding dataset by transforming the plurality of synthetic variations of queries (e.g., synthetic query variations 208, 210, 212) into a plurality of synthetic query embeddings (e.g., synthetic query embeddings 214, 216, 218) and the plurality of queries into a plurality of query embeddings (e.g., query embedding 220). In some implementations, distance threshold generation process 10 generates 102 a plurality of synthetic variations of multiple queries from multiple query-answer pairs (e.g., queries associated with answers 222, 224, 226) and transforms synthetic variations of the queries into respective synthetic query embeddings 228, 230, 232; synthetic query embeddings 234, 236, 238; synthetic query embeddings 240, 242, 244; and query embeddings 246, 248, 250.

In some implementations, distance threshold generation process 10 uses the semantic similarity between the synthetic variations of a query to generate a distance threshold between a query and queries in a semantic cache such that the distance threshold is a function of the similarity of the query to its nearest neighbor. In this manner, semantically similar queries that map to the same answer are used to generate unique distance thresholds for each entry of a semantic cache. Accordingly, when a new target query is processed at the semantic cache, the nearest neighbor of the new target query is used to determine a specific distance threshold. If the new target query is as semantically similar to an entry of the semantic cache as the new target query is to a synthetic variation of the query, the answer for the entry of the semantic cache is returned without invoking an expensive API call to a generative AI model.

In some implementations, distance threshold generation process 10 trains the distance threshold generations by loading part of the dataset ($D_{init}$) into the semantic cache and while intentionally leaving another part out of the semantic cache. This allows distance threshold generation process 10 to be trained on cache misses during the training process (i.e., where a synthetic variation of a query is not within a distance threshold defined for that synthetic variation of the query). Accordingly, the labels for the query and the synthetic variations of the query are the same, as the synthetic variations of the query were produced with small variations from the original query.

Figure 3:
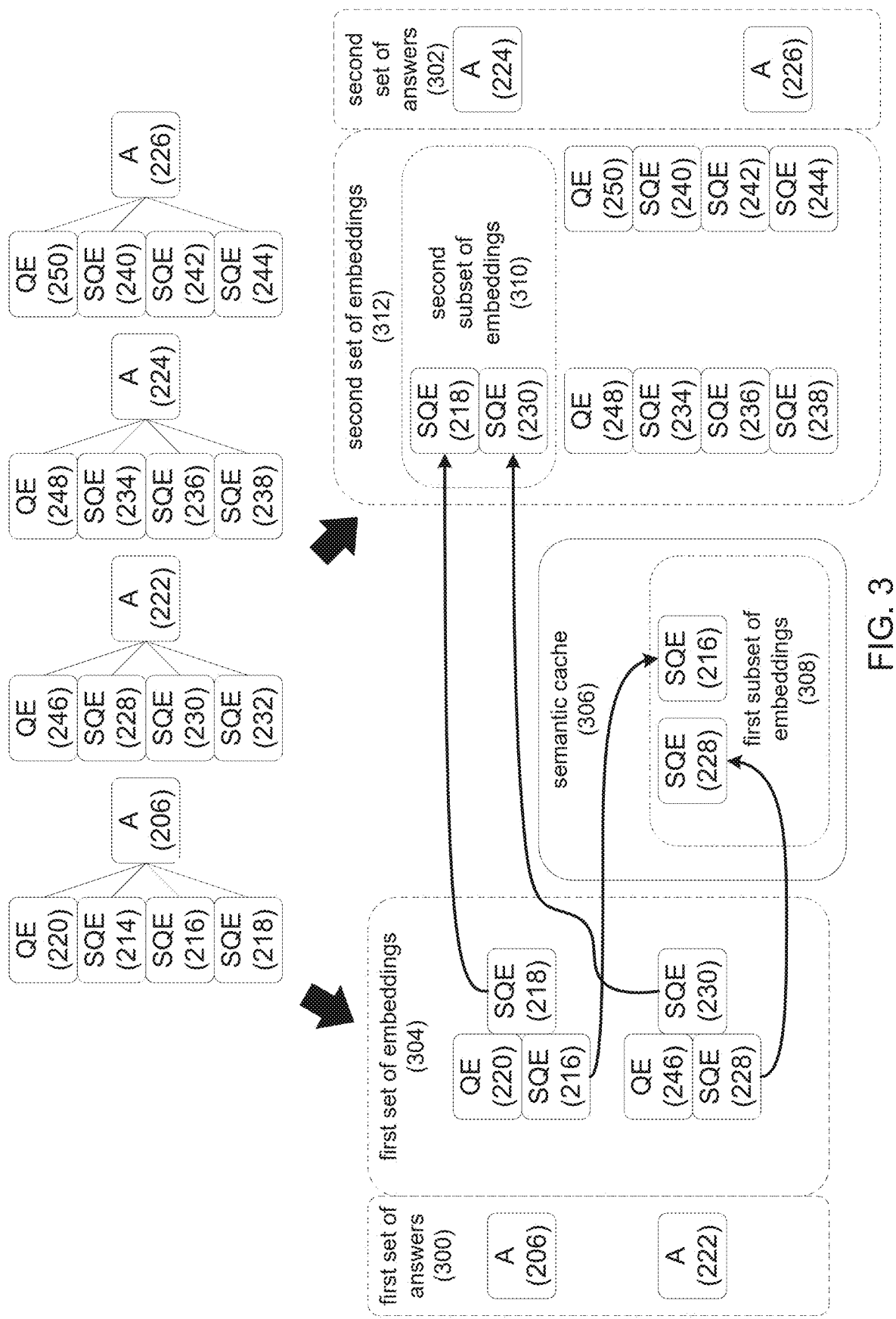

In some implementations, distance threshold generation process 10 divides 120 answers from the dataset of query-answer pairs into a first set of answers and a second set of answers. For example and in some implementations, distance threshold generation process 10 selects a random set of answers from $D_{init}$. This separates the set of answers A into two sets (e.g., denoted as $A_{selected}$ and $A_{notSelected}$). The proportion of elements in the two sets is flexible and may be decided by the user or with a predefined default value. As shown in FIG. 3, distance threshold generation process 10 divides 120 answers 206, 222 into first set of answers 300 and answers 224, 226 into second set of answers 302. In one example, this division is random. In another example, the division is user-defined. In another example, the division is determined by a predefined threshold associated with distance threshold generation process 10 and/or the dataset of query-answer pairs.

In some implementations, distance threshold generation process 10 defines 108 a first set of embeddings from the embedding dataset for storage in a semantic cache. For example, a first set of embeddings (e.g., first set of embeddings 304) includes a set of embeddings that will be stored in the semantic cache (e.g., semantic cache 306). As shown in FIG. 3, synthetic variations of queries 220, 246 (e.g., synthetic queries 216, 228, respectively) are defined within, or assigned to, the first set of embeddings.

In some implementations, defining 108 the first set of embeddings includes identifying 122 a first subset of embeddings that are associated with the first set of answers; and storing 124 the first subset of embeddings in the semantic cache. For example and as described above, suppose that distance threshold generation process 10 divides 120 answer 206 into a first set of answers (e.g., first set of answers 300 with answers that are associated with query embeddings that will be added to semantic cache 306). In this example, the answer $a_i$ (answer 206) belongs to $A_{selected}$. As explained above in $D_{init}$, the answer is associated with a list of N query embeddings $E_{i-selected} = (e_i, e_{i,1}, e_{i,2}, \ldots e_{1,N})$ where $e_i$ corresponds to the embedding of the parent query $q_i$ and the others are embeddings for the synthetic descendants ($q_{i,j}$) of $q_i$. In some implementations, distance threshold generation process 10 identifies 122 a first subset of embeddings as a randomly subset of $E_{i-selected}$. This divides the embeddings into two subsets denoted as $E_{i-selected\_cached}$ (e.g., first subset of embeddings 308) and $E_{i-selected\_notCached}$ (e.g., second subset of embeddings 310). The first subset of embeddings (e.g., first subset of embeddings 308) include randomly selected embeddings and embedding $e_i$ of the parent query that are mapped to the answer $a_i$. In some implementations, distance threshold generation process 10 stores 124 first subset of embeddings 308 in semantic cache 306. The cached data can be summarized as: $D_{cache} = \{a_i:(e_i, e_{i,j})|$ "i" is in $A_{selected}$ and "j" is in $E_{i-selected\_cached}\}$. Referring again to FIG. 3 and in some implementations, distance threshold generation process 10 synthetic queries 216, 228 are identified in first subset of embeddings 308 and are stored 124 in semantic cache 306.

In some implementations, distance threshold generation process 10 defines 110 a second set of embeddings from the embedding dataset, where the second set of embeddings are not stored in the semantic cache. For example, the second set of embeddings (e.g., second set of embeddings 312) represent the embeddings that are compared against the entries of the semantic cache. As shown in FIG. 3, distance threshold generation process 10 defines 110 second set of embeddings 312 to include synthetic query embeddings 234, 236, 238, 240, 242, 244 and query embeddings 248, 250 as these embeddings are not stored in semantic cache 306.

In some implementations, defining 110 the second set of embeddings includes identifying 126 a second subset of embeddings that are associated with the first set of answers; and identifying 128 a plurality of embeddings from the embedding dataset that are associated with the second set of answers. For example, second subset of embeddings 312, $E_{i-selected\_notCached}$, are identified 126 as the embeddings that are associated with the same answer $a_i$ that was drawn from $A_{selected}$ but that not added into semantic cache 306. In some implementations, the second set of embeddings (e.g., second set of embeddings 312) are a "held out" dataset $D_{heldout1}$, where $D_{heldout1} = \{a_i: (e_{i,j})|i$ is in $A_{selected}$ (e.g., first set of answers 300) and j is in $E_{i-selected\_notCached}$ (e.g., second subset of embeddings 310)$\}$.

In some implementations, distance threshold generation process 10 identifies 128 a plurality of embeddings from the embedding dataset that are associated with the second set of answers. For example, distance threshold generation process 10 identifies embeddings for other answers (e.g., answers 224, 226) that belong to $A_{notSelected}$ (e.g., second set of answers 302). The query embeddings associated with those answers (e.g., query embeddings 248, 250 and synthetic query embeddings 234, 236, 238, 240, 242, 244) are grouped into second set of embeddings 312, $D_{heldout2}$, which are also not added into semantic cache 306. $D_{heldout2} = \{a_i: (e_i, e_{i,j})|i$ is in $A_{notSelected}\}$. Accordingly, distance threshold generation process 10 stores first set of embeddings 304 within semantic cache 306 populated with the embeddings defined in $D_{cache}$ and second set of embeddings 312 in $D_{heldout}$ including embeddings which are intentionally left out of semantic cache 306 (but for which distance threshold generation process 10 uses the answer they are associated with for training separate distance thresholds).

Figure 4:
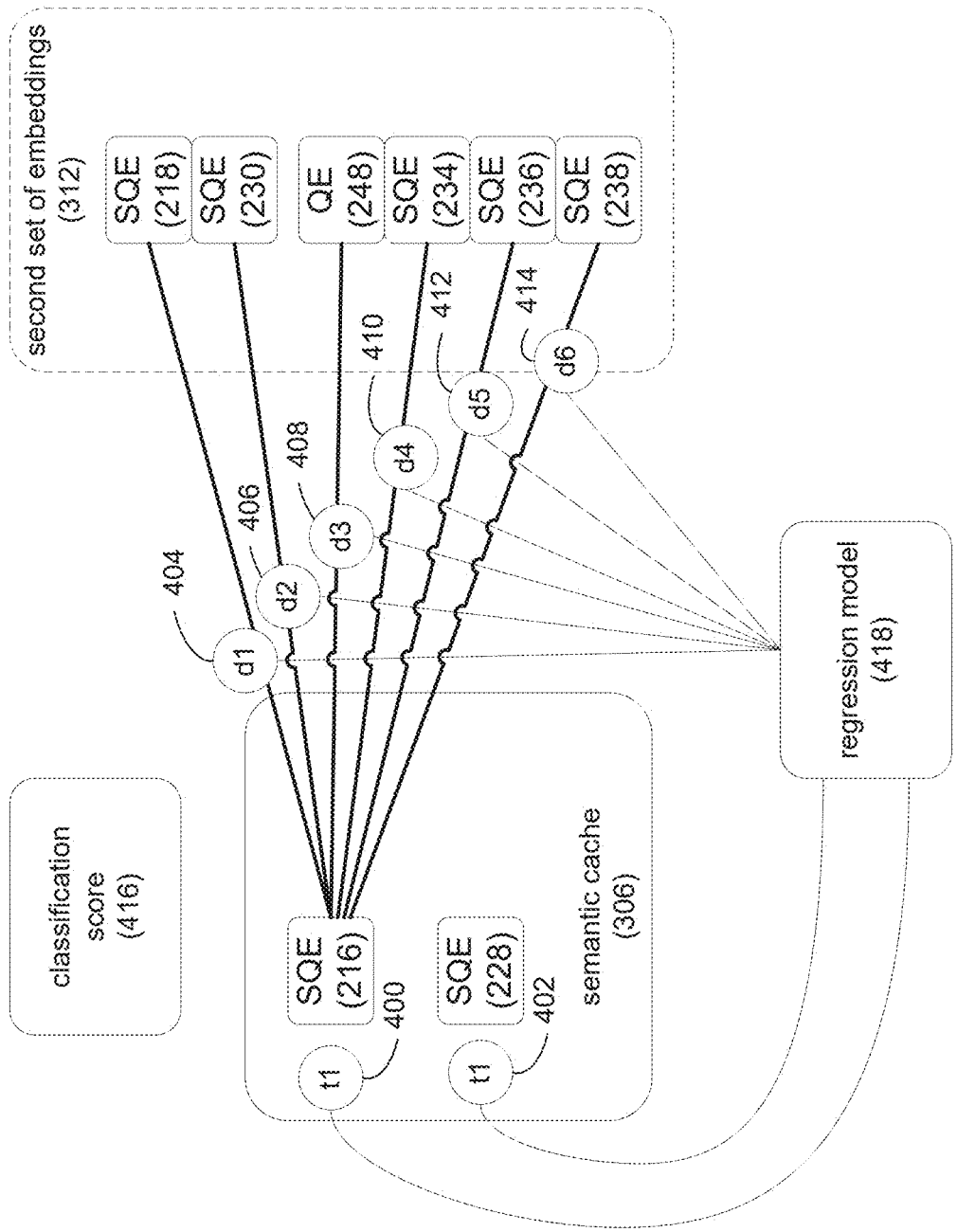

In some implementations, distance threshold generation process 10 assigns 112 a separate distance threshold to each embedding of the first set of embeddings. For example and in contrast to conventional semantic cache approaches where all embeddings are assigned a common distance threshold, distance threshold generation process 10 assigns each embedding in $D_{cache}$ with a separate distance threshold ($t_i$) for the parent query and $t_{i,j}$ for its descendants: $Dt_{cache} = \{a_i:[(e_i, e_{i,j}), (t_i, t_{i,j})]|i$ is in $A_{selected}$ (e.g., first set of answers 300) and j is in $E_{i-selected\_cache}$ (e.g., first set of embeddings 304)$\}$. For example, assuming that there are $N_{selected}$ queries in $D_{cache}$ and N variants for each query, this means that $Dt_{cache}$ now has a set of $N_{selected} \times N$ thresholds which are all different from each other. In some implementations, distance thresholds are initialized as random uniform variables from "0" to "t" where "t" is a user-defined or default threshold. Accordingly, the set of all thresholds may be represented as "T" with cardinality $|T|=N_{selected} \times N$. Referring also to FIG. 4, distance threshold generation process 10 assigns 112 separate distance thresholds (e.g., distance threshold 400 to synthetic query embedding 216 and distance threshold 402 to synthetic query embedding 228) for each embedding in semantic cache 306. As will be discussed in greater detail below, the distance thresholds are optimized by comparing each embedding against the embeddings of second set of embeddings 312 using a distance measurement. With the distance measurement and the knowledge of which synthetic query embeddings are related (i.e., synthetic variations of the same query), distance threshold generation process 10 adjusts distance thresholds 400, 402 to match synthetic query embedding variations of the same query while not matching other synthetic query embeddings. In this manner, semantic cache 306 has separate distance thresholds that result in matches to semantically similar queries, thus reducing the number of semantic cache "misses" that result in expensive calls to generative AI model 200.

In some implementations, distance threshold generation process 10 determines 114 a pairwise distance between each query of the query-answer pairs and the plurality of synthetic variations of the respective query. For example, distance threshold generation process 10 determines the distance (using the same distance "d" as is used to estimate the nearest neighbors) between each synthetic query embedding ($e_{i,j}$) and their parent $e_i$. In one example and as shown in FIG. 4, distance threshold generation process 10 determines 114 pairwise distance 404 between synthetic query embedding 216 and synthetic query embedding 218; pairwise distance 406 between synthetic query embedding 216 and synthetic query embedding 230; pairwise distance 408 between synthetic query embedding 216 and query embedding 248; pairwise distance 410 between synthetic query embedding 216 and synthetic query embedding 234; pairwise distance 412 between synthetic query embedding 216 and synthetic query embedding 236; and pairwise distance 414 between synthetic query embedding 216 and synthetic query embedding 238. In some implementations, the respective pairwise distance for each synthetic query embedding in semantic cache 306 is represented as $d_{i,j}=d(e_i, e_{i,j})$.

In some implementations, distance threshold generation process 10 generates 116 a plurality of distance thresholds for respective pairwise distances between a query and respective synthetic variations of the query using the separate distance threshold assigned for each embedding of the first set of embeddings and the pairwise distance between each query of the query-answer pairs and the plurality of synthetic variations of the respective query. For example, distance threshold generation process 10 uses the pairwise distances between a query embedding and respective synthetic variations of the query to train the distance thresholds for semantically similar queries. In some implementations, all queries "q" from $D_{heldout}$ (e.g., second set of embeddings 312) have an index "i" which identifies their parent query. This parent query may either be present in the cache (if q came from $D_{heldout1}$) or not (if q came from $D_{heldout2}$). Accordingly, distance threshold generation process 10 processes each query from second set of embeddings 312 to determine its nearest neighbor (i.e., the embedding with smallest distance measurement) indexed by (i,j) from $Dt_{cache}$. This embedding $e_{i,j}$ has its own threshold $t_{i,j}$ and distance threshold generation process 10 compares the distance $d_{q-nn}=d(e_q, e_{i,j})$ to determine if the associated answer $a_{nn}$ should be returned to the user from semantic cache 306. From this comparison, there are four possible outcomes:

True positive (TP). This means that $d_{q-nn} \leq t_{i,j}$ and that the index i of the nearest neighbor is indeed the same that of the test query q. In some implementations, a true positive is when the nearest neighbor query is from $D_{heldout1}$ (e.g., second subset of embeddings 310).

False positive (FP). This means that $d_{q-nn} \leq t_{i,j}$ even though the index i identifying the nearest neighbor does not match the index i of the test query q. In other words, the cache has incorrectly retrieved a semantically irrelevant item. This occurs if q comes from either $D_{heldout1}$ (e.g., second subset of embeddings 310) or $D_{heldout2}$ (e.g., second set of embeddings 312).

True negative (TN). This means that $d_{q-nn} > t_{i,j}$ and that there is indeed no sample of index i which is the same as that of the test query in $Dt_{cache}$. This rightfully results in a cache miss as q was indeed not similar to anything in the cache. For example, a necessary condition for this to be possible is that q came from $D_{heldout2}$ (e.g., second set of embeddings 312).

False negative (FN). This means that $d_{q-nn} > t_{i,j}$ even though there was a query of the correct index i in the semantic cache. Accordingly, distance threshold generation process failed to identify a semantically relevant item even though one was present in semantic cache 306. This is because the threshold $t_{i,j}$ is too small and a match might have been identified with a larger threshold. In some implementations, this occurs if q came from $D_{heldout1}$ (e.g., second subset of embeddings 310).

In some implementations, generating 116 the plurality of distance thresholds for the respective pairwise distance between the target query and the respective synthetic variation of the target query includes generating 130 a classification score by processing each query associated with each of the second set of embeddings against the first set of embeddings in the semantic cache. For example, once $Dt_{cache}$ has been built as described above, distance threshold generation process 10 processes each test query d from $D_{heldout}$ (e.g., second set of embeddings 312) to assign a result (e.g., TP, FP, TN or FN). In some implementations, distance threshold generation process 10 generates 130 a classification score (e.g., classification score 416) by processing each query in $D_{heldout}$ (e.g., second set of embeddings 312) to obtain values for the numbers of test queries that fall in each one of these categories (e.g., TP, FP, TN, and/or FN). In some implementations, classification score 416 is an F1 score defined as the harmonic mean of precision (as defined in Equation 1 below) and recall (as defined in Equation 2 below), where the F1 score classification score is defined below in Equation 3.

$$\text{Precision}=TP/(TP+FP) \quad (1)$$

$$\text{Recall}=TP/(TP+FN) \quad (2)$$

$$F1 \text{ score}=\text{Precision} \cdot \text{Recall}/\text{Precision}+\text{Recall} \quad (3)$$

In some implementations, generating 116 the plurality of distance thresholds for the respective pairwise distance between the target query and the respective synthetic variation of the target query includes performing 132 iterative optimizations on the separate distance thresholds assigned to each embedding of the first set of embeddings using the classification score. For example, distance threshold generation process 10 keeps all of the embeddings in $Dt_{cache}$ constant to perform 132 iterative optimizations of the separate distance thresholds such that distance threshold generation process 10 determines the optimal set of thresholds T such that the F1 score classification score (e.g., classification score 416) over the $D_{heldout}$ dataset is maximized. An example of the optimization is described below in Equation 4:

Optimization function=$\mathrm{argmax}_T F1[Dt_{cache}(T), D_{heldout}]$,  (4)

where threshold dependence T is made explicit in $Dt_{cache}(T)$.

In some implementations, not all embeddings from $Dt_{cache}(T)$ appear as nearest neighbors during the calculation of the F1 score. In this case, their distance threshold(s) will never be used for comparison and are removed from T so the optimization problem is carried out only over a subset of T.

In some implementations, performing 132 the iterative optimization described above is not convex and not continuous, meaning that gradient methods cannot be used. In this example, the known process of simulated annealing allows for probabilistic exploration determined by a temperature parameter to escape local optima and find globally optimal or near-optimal solutions. The performing 132 of iterative optimization ends with a plurality of distance thresholds $T_{opt}$ that maximizes the F1 score (e.g., classification score 416) over the evaluation dataset $D_{heldout}$ (e.g., second set of embeddings 312).

In some implementations, distance threshold generation process 10 generates a mapping of the plurality of distance thresholds to the pairwise distances as shown below in Table 1, where each entry describes an input nearest neighbor distance for synthetic query embeddings and respective distance thresholds that are optimized to result in the highest precision and recall.

TABLE 1

| Feature | Label |
|---|---|
| $d_{1,1} = 0$ | $t_{1,1\text{-}opt}$ |
| $d_{1,2}$ | $t_{1,2\text{-}opt}$ |
| $d_{1,3}$ | $t_{1,3\text{-}opt}$ |
| ... | ... |
| $d_{1,N}$ | $t_{1,N\text{-}opt}$ |
| $d_{2,1}$ | $t_{2,1\text{-}opt}$ |
| $d_{2,2} = 0$ | $t_{2,2\text{-}opt}$ |
| $d_{2,3}$ | $t_{2,3\text{-}opt}$ |
| ... | ... |
| $d_{2,N}$ | $t_{2,N\text{-}opt}$ |
| ... | |

In some implementations, generating 116 the plurality of distance thresholds for the respective pairwise distance between the target query and the respective synthetic variation of the target query includes training 134 a regression model to generate the plurality of distance thresholds by using the pairwise distance between each query of the query-answer pairs and the plurality of synthetic variations of the respective query. For example, distance threshold generation process 10 provides the mapping between the plurality of distance thresholds and the pairwise distances as shown in Table 1 to train 134 a regression model $M_{reg}$ (e.g., regression model 418) where the features are the values of $d_{i,j}$ and the targets are the optimal thresholds $t_{i,j\text{-}opt}$. A regression model is a statistical model that defines relationships between a dependent variable and one or more independent variables by modeling the value of the dependent variable as a function of the independent variable(s). Once regression model 418 is trained, distance threshold generation process 10 can use regression model 418 in inference mode to generate an optimal distance threshold for a synthetic sample $q_{i,j}$ given its distance $d_{i,j}$ to its parent sample $q_i$. In this manner, $t_{i,j\text{-}opt}$ is the result of processing the distance $d_{i,j}$ using regression model 418 (e.g., $M_{reg}(d_{i,j})$). Accordingly, distance threshold generation process 10 uses the distance dependent F1 score optimized distance threshold to assign each embedding in the semantic cache its own optimal distance threshold that maximizes the accuracy (i.e., in terms of precision and recall) of returning the correct semantically related query and therefore the correct precomputed answer.

In some implementations, distance threshold generation process 10 processes 118 a subsequent query using the plurality of synthetic variations of queries from the semantic cache and the plurality of distance thresholds. For example, with the plurality of distance thresholds, distance threshold generation process 10 is able to process subsequent queries (i.e., any query processed after the plurality of distance thresholds are generated) using the plurality of synthetic variations to provide a "cloud" of similar queries in a semantic cache where the distance threshold for each synthetic variation is uniquely optimized to maximize the likelihood of identifying a semantically-similar query in the semantic cache and returning the associated answer without invoking generative AI model 200.

In some implementations, distance threshold generation process 10 processes 118 the subsequent query by determining 136 a distance between the subsequent query and each of the plurality of synthetic variations of queries; identifying 138 a nearest neighbor query from the plurality of synthetic variations of queries from the semantic cache using the distance between the subsequent query and each of the plurality of synthetic variations of queries; determining 140 a distance threshold for nearest neighbor query based upon, at least in part, the plurality of distance thresholds; and providing 142 an answer associated with the nearest neighbor query from the semantic cache in response to determining that the distance between the subsequent query and the nearest neighbor query. For example, distance threshold generation process 10 processes a subsequent query q and determines a distance between the subsequent query and each of the entries in semantic cache 306. Distance threshold generation process 10 identifies 138 a nearest neighbor according to distance d (i.e., by identifying a semantic cache entry with the smallest distance from an embedding of subsequent query q).

In some implementations, distance threshold generation process 10 determines 140 a distance threshold for nearest neighbor query based upon, at least in part, the plurality of distance thresholds. For example, distance threshold generation process 10 determines the nearest neighbor specific-optimized threshold by processing the nearest neighbor distance in regression model 418 (e.g., $t_{i,j}=M_{reg}(d(q_i, q_{i,j}))$ where (i,j) indexes the nearest neighbor and $q_i$ is the parent query to $q_{i,j}$) to obtain the distance threshold for the nearest neighbor query. Distance threshold generation process 10 provides 142 an answer associated with the nearest neighbor query from the semantic cache in response to determining that the distance between the subsequent query and the nearest neighbor query. For example, distance threshold generation process 10 compares distance $d_{q\text{-}nn}$ between the nearest neighbor and the subsequent query q to the distance threshold and if $d_{q\text{-}nn} \leq t_{i,j}$, distance threshold generation process 10 provides 142 the answer associated with $q_i$ directly back to the user without invoking generative AI model 200. Otherwise (i.e., if $d_{q\text{-}nn} > t_{i,j}$), distance threshold generation process 10 provides the subsequent query to generative AI model 200 to generate an answer, which takes more time.

Figure 5:
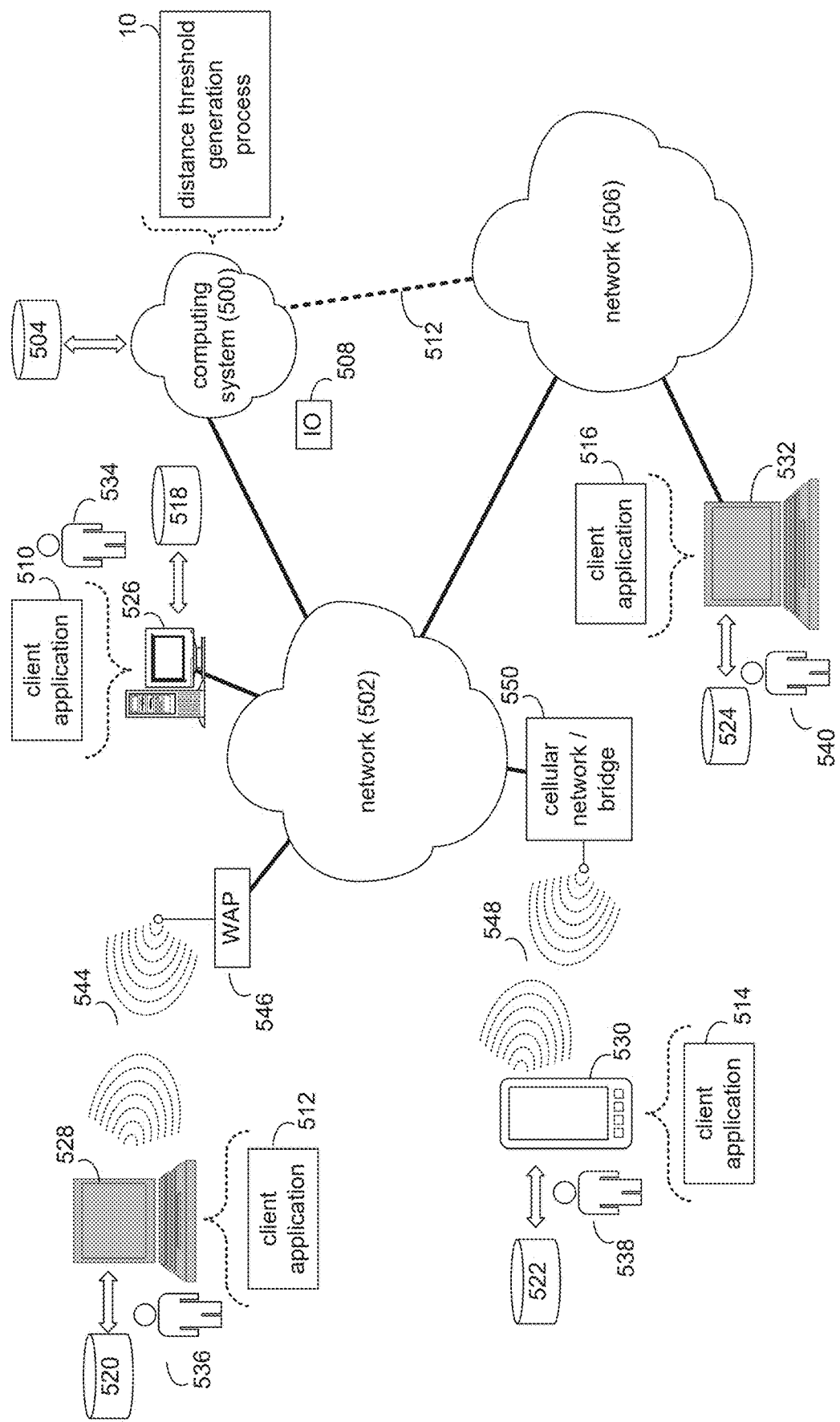
FIG. 5 is a diagrammatic view of computer system and the distance threshold generation process coupled to a distributed computing network.

System Overview:

Referring to FIG. 5, a distance threshold generation process 10 is shown to reside on and is executed by computing system 500, which is connected to network 502 (e.g., the Internet or a local area network). Examples of computing system 500 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of computing system 500 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of distance threshold generation process 10, which are stored on storage device 504 included within computing system 500, are executed by one or more processors (not shown) and one or more memory architectures (not shown) included within computing system 500. Storage device 504 may include: a hard disk drive; an optical drive; a RAID device; a random-access memory (RAM); a read-only memory (ROM); and all forms of flash memory storage devices. Additionally or alternatively, some portions of the instruction sets and subroutines of distance threshold generation process 10 are stored on storage devices (and/or executed by processors and memory architectures) that are external to computing system 500.

In some implementations, network 502 is connected to one or more secondary networks (e.g., network 506), examples of which include: a local area network; a wide area network; or an intranet.

Various input/output (IO) requests (e.g., IO request 508) are sent from client applications 510, 512, 514, 516 to computing system 500. Examples of IO request 508 include data write requests (e.g., a request that content be written to computing system 500) and data read requests (e.g., a request that content be read from computing system 500).

The instruction sets and subroutines of client applications 510, 512, 514, 516, which may be stored on storage devices 518, 520, 522, 524 (respectively) coupled to client electronic devices 526, 528, 530, 532 (respectively), may be executed by one or more processors (not shown) and one or more memory architectures (not shown) incorporated into client electronic devices 526, 528, 530, 532 (respectively). Storage devices 518, 520, 522, 524 may include: hard disk drives; tape drives; optical drives; RAID devices; random access memories (RAM); read-only memories (ROM), and all forms of flash memory storage devices. Examples of client electronic devices 526, 528, 530, 532 include personal computer 526, laptop computer 528, smartphone 530, laptop computer 532, a server (not shown), a data-enabled, and a dedicated network device (not shown). Client electronic devices 526, 528, 530, 532 each execute an operating system.

Users 534, 536, 538, 540 may access computing system 500 directly through network 502 or through secondary network 506. Further, computing system 500 may be connected to network 502 through secondary network 506, as illustrated with link line 542.

The various client electronic devices may be directly or indirectly coupled to network 502 (or network 506). For example, personal computer 526 is shown directly coupled to network 502 via a hardwired network connection. Further, laptop computer 532 is shown directly coupled to network 506 via a hardwired network connection. Laptop computer 528 is shown wirelessly coupled to network 502 via wireless communication channel 544 established between laptop computer 528 and wireless access point (e.g., WAP) 546, which is shown directly coupled to network 502. WAP 546 may be, for example, an IEEE 802.11a, 802.11b, 802.11g, 802.11n, Wi-Fi®, and/or Bluetooth® device that is capable of establishing a wireless communication channel 544 between laptop computer 528 and WAP 546. Smartphone 530 is shown wirelessly coupled to network 502 via wireless communication channel 548 established between smartphone 530 and cellular network/bridge 550, which is shown directly coupled to network 502.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this A, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   processing a dataset of query-answer pairs previously processed by a generative artificial intelligence (AI) model;
   generating a plurality of synthetic variations of queries from the dataset of query-answer pairs;
   mapping each of the plurality of synthetic variations of queries to a corresponding answer from the dataset of query-answer pairs;
   generating an embedding dataset by transforming the plurality of synthetic variations of queries into a plurality of synthetic query embeddings and the plurality of queries into a plurality of query embeddings;
   defining a first set of embeddings from the embedding dataset for storage in a semantic cache;
   defining a second set of embeddings from the embedding dataset, wherein the second set of embeddings are not stored in the semantic cache;
   assigning a separate distance threshold to each embedding of the first set of embeddings;
   determining a pairwise distance between each query of the query-answer pairs and the plurality of synthetic variations of the respective query;
   generating a plurality of distance thresholds for respective pairwise distances between a query and respective synthetic variations of the query using the separate distance threshold assigned for each embedding of the first set of embeddings and the pairwise distance between each query of the query-answer pairs and the plurality of synthetic variations of the respective query; and processing a subsequent query using the plurality of synthetic variations of queries from the semantic cache and the plurality of distance thresholds.

2. The computer-implemented method of claim 1, further comprising:
dividing answers from the dataset of query-answer pairs into a first set of answers and a second set of answers.

3. The computer-implemented method of claim 2, wherein defining the first set of embeddings includes:
identifying a first subset of embeddings that are associated with the first set of answers; and
storing the first subset of embeddings in the semantic cache.

4. The computer-implemented method of claim 3, wherein defining the second set of embeddings includes:
identifying a second subset of embeddings that are associated with the first set of answers; and
identifying a plurality of embeddings from the embedding dataset that are associated with the second set of answers.

5. The computer-implemented method of claim 1, wherein generating the plurality of distance thresholds for the respective pairwise distance between the target query and the respective synthetic variation of the target query includes generating a classification score by processing each query associated with each of the second set of embeddings against the first set of embeddings in the semantic cache.

6. The computer-implemented method of claim 5, wherein generating the plurality of distance thresholds for the respective pairwise distance between the target query and the respective synthetic variation of the target query includes performing iterative optimizations on the separate distance thresholds assigned to each embedding of the first set of embeddings using the classification score.

7. The computer-implemented method of claim 1, wherein generating the plurality of distance thresholds for the respective pairwise distance between the target query and the respective synthetic variation of the target query includes training a regression model to generate the plurality of distance thresholds by using the pairwise distance between each query of the query-answer pairs and the plurality of synthetic variations of the respective query.

8. A computing system comprising:
a memory; and
a processor configured to:
process a dataset of query-answer pairs previously processed by a generative artificial intelligence (AI) model;
generate a plurality of synthetic variations of queries from the dataset of query-answer pairs;
map each of the plurality of synthetic variations of queries to a corresponding answer from the dataset of query-answer pairs;
generate an embedding dataset by transforming the plurality of synthetic variations of queries into a plurality of synthetic query embeddings and the plurality of queries into a plurality of query embeddings;
define a first set of embeddings from the embedding dataset for storage in a semantic cache;
define a second set of embeddings from the embedding dataset, wherein the second set of embeddings are not stored in the semantic cache;
assign a separate distance threshold to each embedding of the first set of embeddings;
determine a pairwise distance between each query of the query-answer pairs and the plurality of synthetic variations of the respective query;
generate a plurality of distance thresholds for respective pairwise distances between a query and respective synthetic variations of the query using the separate distance threshold assigned for each embedding of the first set of embeddings and the pairwise distance between each query of the query-answer pairs and the plurality of synthetic variations of the respective query; and
process a subsequent query using the plurality of synthetic variations of queries from the semantic cache and the plurality of distance thresholds by:
determining a distance between the subsequent query and each of the plurality of synthetic variations of queries;
identifying a nearest neighbor query from the plurality of synthetic variations of queries from the semantic cache using the distance between the subsequent query and each of the plurality of synthetic variations of queries;
determining a distance threshold for nearest neighbor query based upon, at least in part, the plurality of distance thresholds; and
providing an answer associated with the nearest neighbor query from the semantic cache in response to determining that the distance between the subsequent query and the nearest neighbor query.

9. The computing system of claim 8, wherein the processor is further configured to:
divide answers from the dataset of query-answer pairs into a first set of answers and a second set of answers.

10. The computing system of claim 9, wherein defining the first set of embeddings includes:
identifying a first subset of embeddings that are associated with the first set of answers; and
storing the first subset of embeddings in the semantic cache.

11. The computing system of claim 10, wherein defining the second set of embeddings includes:
identifying a second subset of embeddings that are associated with the second set of answers; and
identifying a plurality of embeddings from the embedding dataset that are associated with the second set of answers.

12. The computing system of claim 8, wherein generating the plurality of distance thresholds for the respective pairwise distance between the target query and the respective synthetic variation of the target query includes generating a classification score by processing each query associated with each of the second set of embeddings against the first set of embeddings in the semantic cache.

13. The computing system of claim 12, wherein generating the plurality of distance thresholds for the respective pairwise distance between the target query and the respective synthetic variation of the target query includes performing iterative optimizations on the separate distance thresholds assigned to each embedding of the first set of embeddings using the classification score.

14. The computing system of claim 8, wherein generating the plurality of distance thresholds for the respective pairwise distance between the target query and the respective synthetic variation of the target query includes training a regression model to generate the plurality of distance thresholds by using the pairwise distance between each query of the query-answer pairs and the plurality of synthetic variations of the respective query.

15. A computer program product residing on a non-transitory computer readable medium having a plurality of instructions stored thereon which, when executed by a processor, cause the processor to perform operations comprising:
processing a dataset of query-answer pairs previously processed by a generative artificial intelligence (AI) model;
generating a plurality of synthetic variations of queries from the dataset of query-answer pairs;
mapping each of the plurality of synthetic variations of queries to a corresponding answer from the dataset of query-answer pairs;
generating an embedding dataset by transforming the plurality of synthetic variations of queries into a plurality of synthetic query embeddings and the plurality of queries into a plurality of query embeddings;
defining a first set of embeddings from the embedding dataset for storage in a semantic cache;
defining a second set of embeddings from the embedding dataset, wherein the second set of embeddings are not stored in the semantic cache;
assigning a separate distance threshold to each embedding of the first set of embeddings;
determining a pairwise distance between each query of the query-answer pairs and the plurality of synthetic variations of the respective query;
generating a plurality of distance thresholds for respective pairwise distances between a query and respective synthetic variations of the query using the separate distance threshold assigned for each embedding of the first set of embeddings and the pairwise distance between each query of the query-answer pairs and the plurality of synthetic variations of the respective query;
processing a subsequent query using the plurality of synthetic variations of queries from the semantic cache and the plurality of distance thresholds by:
determining a distance between the subsequent query and each of the plurality of synthetic variations of queries;
identifying a nearest neighbor query from the plurality of synthetic variations of queries from the semantic cache using the distance between the subsequent query and each of the plurality of synthetic variations of queries;
determining a distance threshold for nearest neighbor query based upon, at least in part, the plurality of distance thresholds; and
providing an answer associated with the nearest neighbor query from the semantic cache in response to determining that the distance between the subsequent query and the nearest neighbor query.

16. The computer program product of claim 15, wherein the operations further comprise:
dividing answers from the dataset of query-answer pairs into a first set of answers and a second set of answers.

17. The computer program product of claim 16, wherein defining the first set of embeddings includes:
identifying a first subset of embeddings that are associated with the first set of answers; and
storing the first subset of embeddings in the semantic cache.

18. The computer program product of claim 15, wherein defining the second set of embeddings includes:
identifying a second subset of embeddings that are associated with the second set of answers; and
identifying a plurality of embeddings from the embedding dataset that are associated with the second set of answers.

19. The computer program product of claim 15, wherein generating the plurality of distance thresholds for the respective pairwise distance between the target query and the respective synthetic variation of the target query includes generating a classification score by processing each query associated with each of the second set of embeddings against the first set of embeddings in the semantic cache.

20. The computer program product of claim 19, wherein generating the plurality of distance thresholds for the respective pairwise distance between the target query and the respective synthetic variation of the target query includes performing iterative optimizations on the separate distance thresholds assigned to each embedding of the first set of embeddings using the classification score.

* * * * *